(12) United States Patent
Yamauchi et al.

(10) Patent No.: US 8,225,411 B2
(45) Date of Patent: Jul. 17, 2012

(54) CONTENTS MANAGEMENT SYSTEM, AND CONTENTS MANAGEMENT DEVICE

(75) Inventors: Hiroki Yamauchi, Osaka (JP); Takumi Tanabe, Hyogo (JP)

(73) Assignee: Panasonic Corporation, Osaka (JP)

( * ) Notice: Subject to any disclaimer, the term of this patent is extended or adjusted under 35 U.S.C. 154(b) by 982 days.

(21) Appl. No.: 12/066,430

(22) PCT Filed: Sep. 11, 2006

(86) PCT No.: PCT/JP2006/317995
§ 371 (c)(1),
(2), (4) Date: Mar. 11, 2008

(87) PCT Pub. No.: WO2007/032315
PCT Pub. Date: Mar. 22, 2007

(65) Prior Publication Data
US 2009/0154694 A1    Jun. 18, 2009

(30) Foreign Application Priority Data
Sep. 15, 2005    (JP) .................................. 2005-268766

(51) Int. Cl.
*G06F 7/04*    (2006.01)
(52) U.S. Cl. ............... 726/26; 726/29; 726/31; 713/156; 713/171
(58) Field of Classification Search .................. None
See application file for complete search history.

(56) References Cited

U.S. PATENT DOCUMENTS

| | | | | |
|---|---|---|---|---|
| 7,188,224 B2 * | 3/2007 | Ohta et al. | .................... | 711/163 |
| 7,526,657 B2 * | 4/2009 | Saneto et al. | ................. | 713/193 |
| 7,539,306 B2 * | 5/2009 | Ohta et al. | .................... | 380/201 |
| 7,752,433 B2 * | 7/2010 | Yamauchi et al. | ............ | 713/156 |
| 2002/0114462 A1 | 8/2002 | Kudo et al. | | |
| 2004/0039911 A1 | 2/2004 | Oka et al. | | |
| 2004/0225612 A1 | 11/2004 | Shimojima et al. | | |
| 2005/0123278 A1 | 6/2005 | Yamashita et al. | | |

(Continued)

FOREIGN PATENT DOCUMENTS

JP    7-98664    4/1995

(Continued)

OTHER PUBLICATIONS

Supplementary European Search Report issued Dec. 23, 2009 in EP 06 78 3268.

(Continued)

*Primary Examiner* — Pramila Parthasarathy
(74) *Attorney, Agent, or Firm* — Wenderoth, Lind & Ponack, L.L.P.

(57) ABSTRACT

Provided is a content management device, which is connected with a plurality of terminal devices for performing a content moving operation while considering the conveniences of the users of the individual terminal devices. The content management device comprises a content storage unit stored with one or more contents, a move information management unit stored with first range information indicating the partial or entire range of the content to be moved, a range information receiving unit for accepting second range information indicating the range requiring the move, from one terminal device, a judgement unit for deciding whether or not the range indicated by the first range information and the range indicated by the second range information overlap at least partially, and a control unit for permitting the required range to be moved to the terminal device, in case the decision by the judgement unit is NO.

24 Claims, 14 Drawing Sheets

U.S. PATENT DOCUMENTS

2005/0204110 A1  9/2005  Mihara et al.

FOREIGN PATENT DOCUMENTS

| | | |
|---|---|---|
| JP | 2002-245718 | 8/2002 |
| JP | 2003-22338 | 1/2003 |
| JP | 2003-85321 | 3/2003 |
| JP | 2004-199180 | 7/2004 |
| JP | 2005-158056 | 6/2005 |

OTHER PUBLICATIONS

International Search Report issued Nov. 7, 2006 in the International (PCT) Application of which the present application is the U.S. National Stage.

Digital Transmission Content Protection Specification, vol. 1, Revision 1, pp. 1-81, Feb. 2005.

* cited by examiner

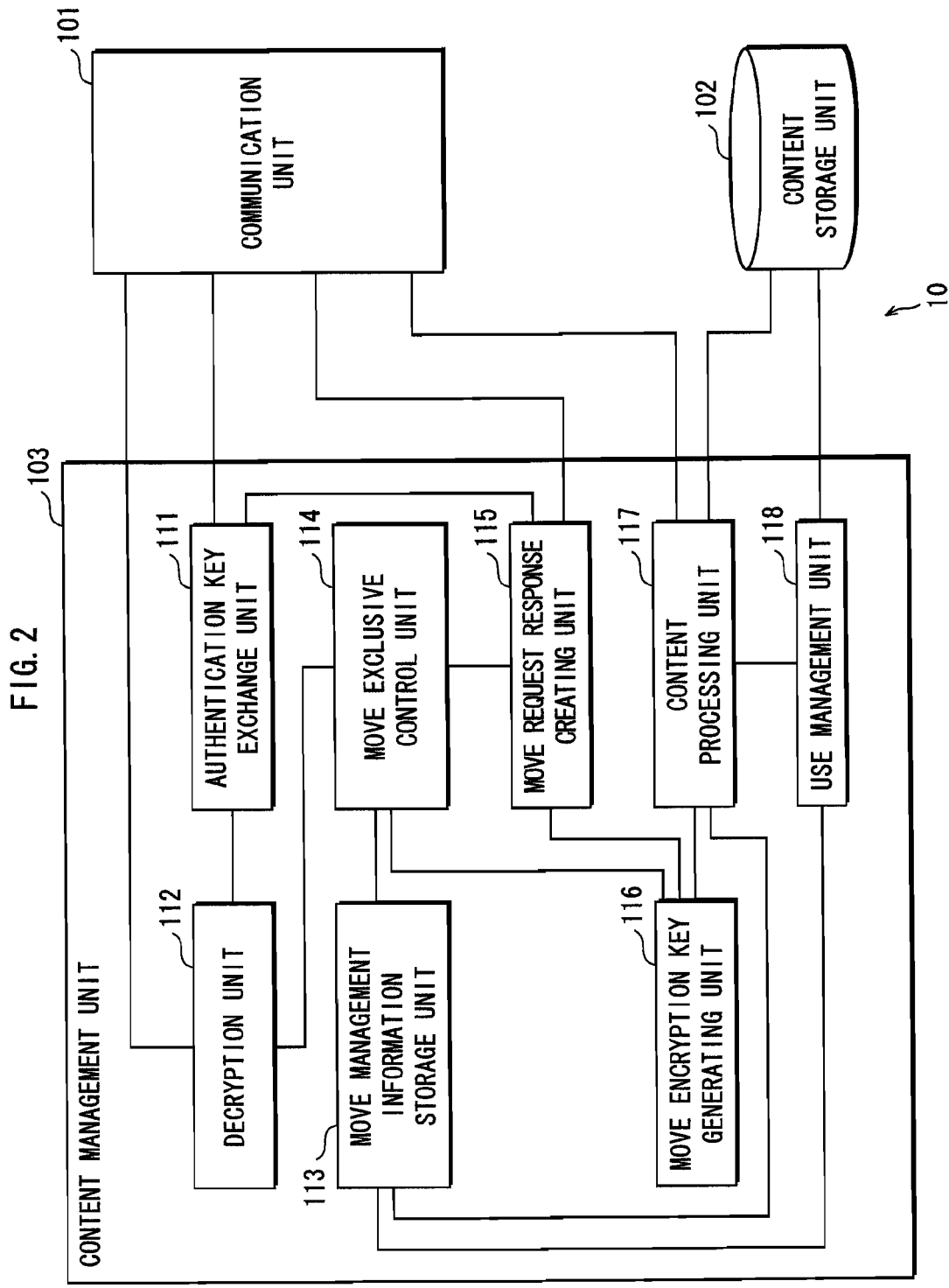

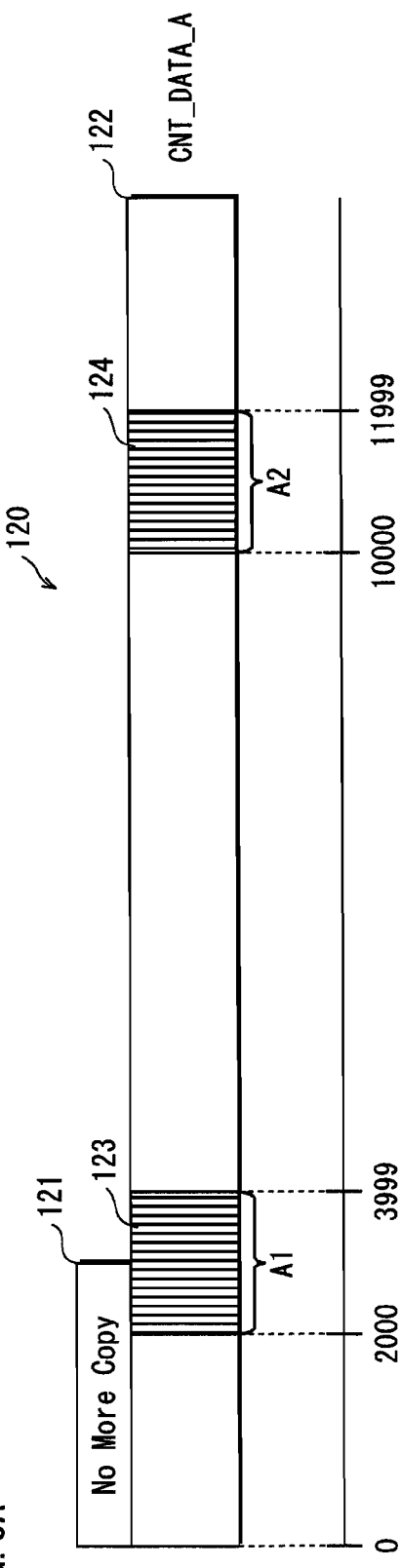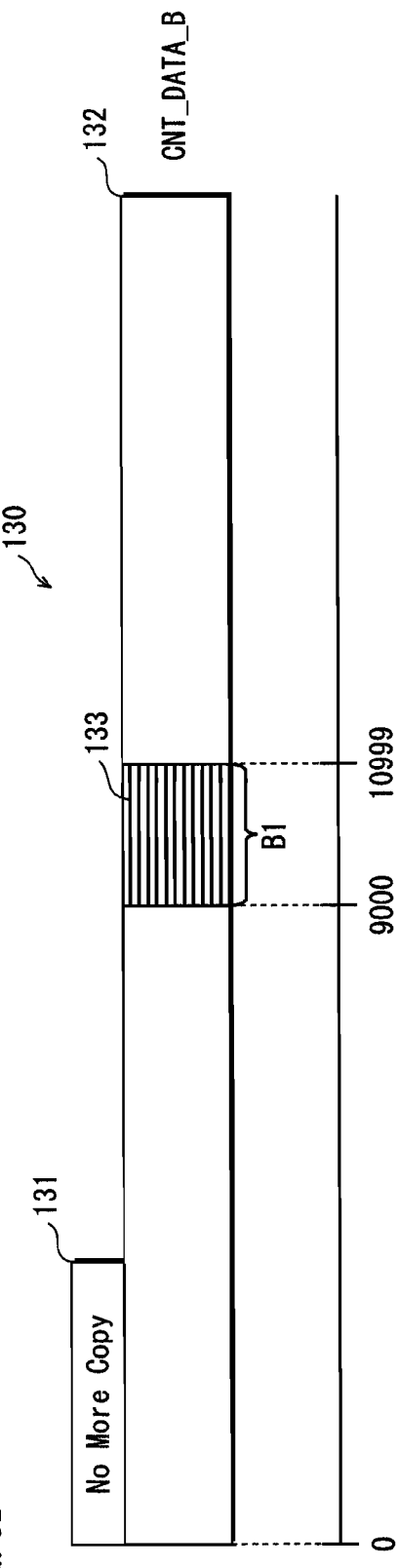

FIG. 4

| CONTENT NAME | PARTIAL CONTENT NAME | CONTENT IDENTIFICATION INFORMATION | CONTENT RANGE INFORMATION |
|---|---|---|---|
| CONTENT A | DRAMA (1) | http://192.168.0.1/contentsA.mpg | 0 - 1999 |
| CONTENT A | DRAMA (2) | http://192.168.0.1/contentsA.mpg | 2000 - 3999 |
| CONTENT A | DRAMA (3) | http://192.168.0.1/contentsA.mpg | 4000 - 5999 |
| ... | ... | ... | ... |
| CONTENT B | NEWS (1) | http://192.168.0.1/contentsB.mpg | 0 - 999 |
| CONTENT B | SPORTS (1) | http://192.168.0.1/contentsB.mpg | 1000 - 2999 |
| CONTENT B | NEWS (2) | http://192.168.0.1/contentsB.mpg | 3000 - 3999 |
| ... | ... | ... | ... |

FIG. 5

| MOVE EXCLUSIVE CONTROL RANGE | MOVE ENCRYPTION KEY | ENCRYPTION KEY IDENTIFICATION INFORMATION | |
|---|---|---|---|
| http://192.168.0.1/contentsA.mpg<br>bytes = 9000 - 10999 | Kmove_01 | KID_01 | ~151 |
| http://192.168.0.1/contentsB.mpg<br>bytes = 2000 - 3999 | Kmove_02 | KID_02 | ~152 |

| | MOVE EXCLUSIVE CONTROL RANGE | MOVE ENCRYPTION KEY | ENCRYPTION KEY IDENTIFICATION INFORMATION | |
|---|---|---|---|---|
| | http://192.168.0.1/contentsA.mpg<br>bytes = 9000 - 10999 | Kmove_01 | KID_01 | ~151 |
| | http://192.168.0.1/contentsB.mpg<br>bytes = 2000 - 3999 | Kmove_02 | KID_02 | ~152 |
| 161 | http://192.168.0.1/contentsA.mpg<br>bytes = 2000 - 3999 | | | |
| 162 | http://192.168.0.1/contentsA.mpg<br>bytes = 10000 - 11999 | | | |
| 163 | http://192.168.0.1/contentsB.mpg<br>bytes = 9000 - 10999 | | | |

FIG. 7

| MOVE EXCLUSIVE CONTROL RANGE | MOVE ENCRYPTION KEY | ENCRYPTION KEY IDENTIFICATION INFORMATION | |
|---|---|---|---|
| http://192.168.0.1/contentsA.mpg<br>bytes = 9000 - 10999 | Kmove_01 | KID_01 | |
| http://192.168.0.1/contentsB.mpg<br>bytes = 2000 - 3999 | Kmove_02 | KID_02 | |
| http://192.168.0.1/contentsA.mpg<br>bytes = 2000 - 3999 | Kmove_03 | KID_03 | ~171 |
| http://192.168.0.1/contentsB.mpg<br>bytes = 9000 - 10999 | Kmove_04 | KID_04 | ~172 |

| CONTENT IDENTIFICATION INFORMATION | TRANSMISSION COMPLETION RANGE CONTENT RANGE INFORMATION | USE FLAG | DELETION FLAG | |
|---|---|---|---|---|
| http://192.168.0.1/contentsA.mpg | 2000 - 3999 | 1 | 0 | 181 |
| http://192.168.0.1/contentsB.mpg | 9000 - 10999 | 0 | 0 | 182 |

| CONTENT IDENTIFICATION INFORMATION | CONTENT RANGE INFORMATION |
|---|---|
| http://192.168.0.1/contentsA.mpg | 2000 - 3999 |
| http://192.168.0.1/contentsA.mpg | 10000 - 11999 |
| http://192.168.0.1/contentsB.mpg | 9000 - 10999 |

FIG. 11

| MOVE RANGE | | | |
|---|---|---|---|
| CONTENT IDENTIFICATION INFORMATION | CONTENT RANGE INFORMATION | MOVE ENCRYPTION KEY | MOVE KEY IDENTIFICATION INFORMATION |
| http://192.168.0.1/contentsA.mpg | 2000 – 3999 | Kmove_03 | KID_03 |
| http://192.168.0.1/contentsB.mpg | 9000 – 10999 | Kmove_04 | KID_04 |

| CONTENT IDENTIFICATION INFORMATION | RECEPTION COMPLETION RANGE | |
|---|---|---|
| | CONTENT RANGE INFORMATION | USE FLAG |
| http://192.168.0.1/contentsA.mpg | 2000 – 3999 | 1 |
| http://192.168.0.1/contentsB.mpg | 9000 – 10999 | 0 |

250

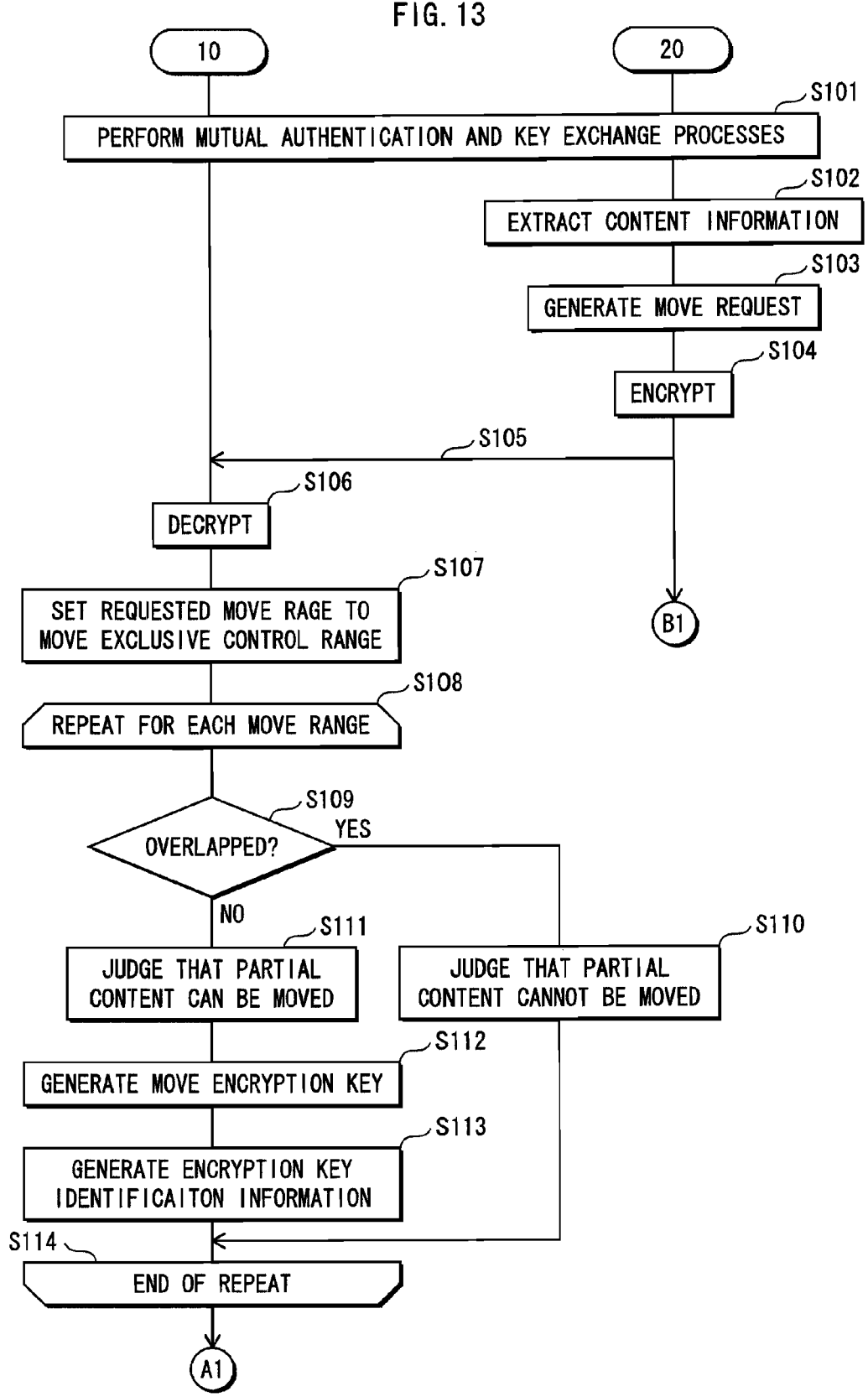

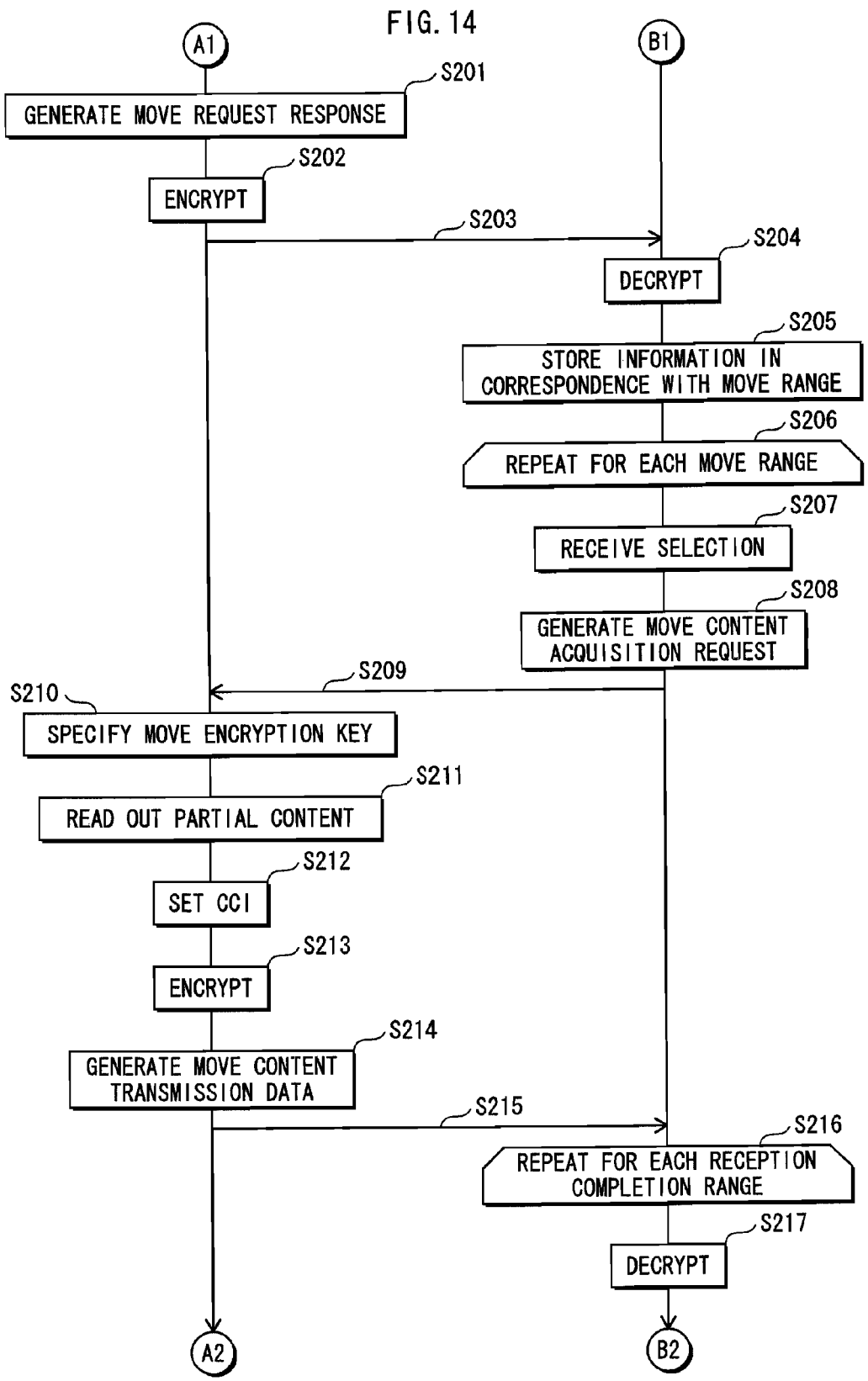

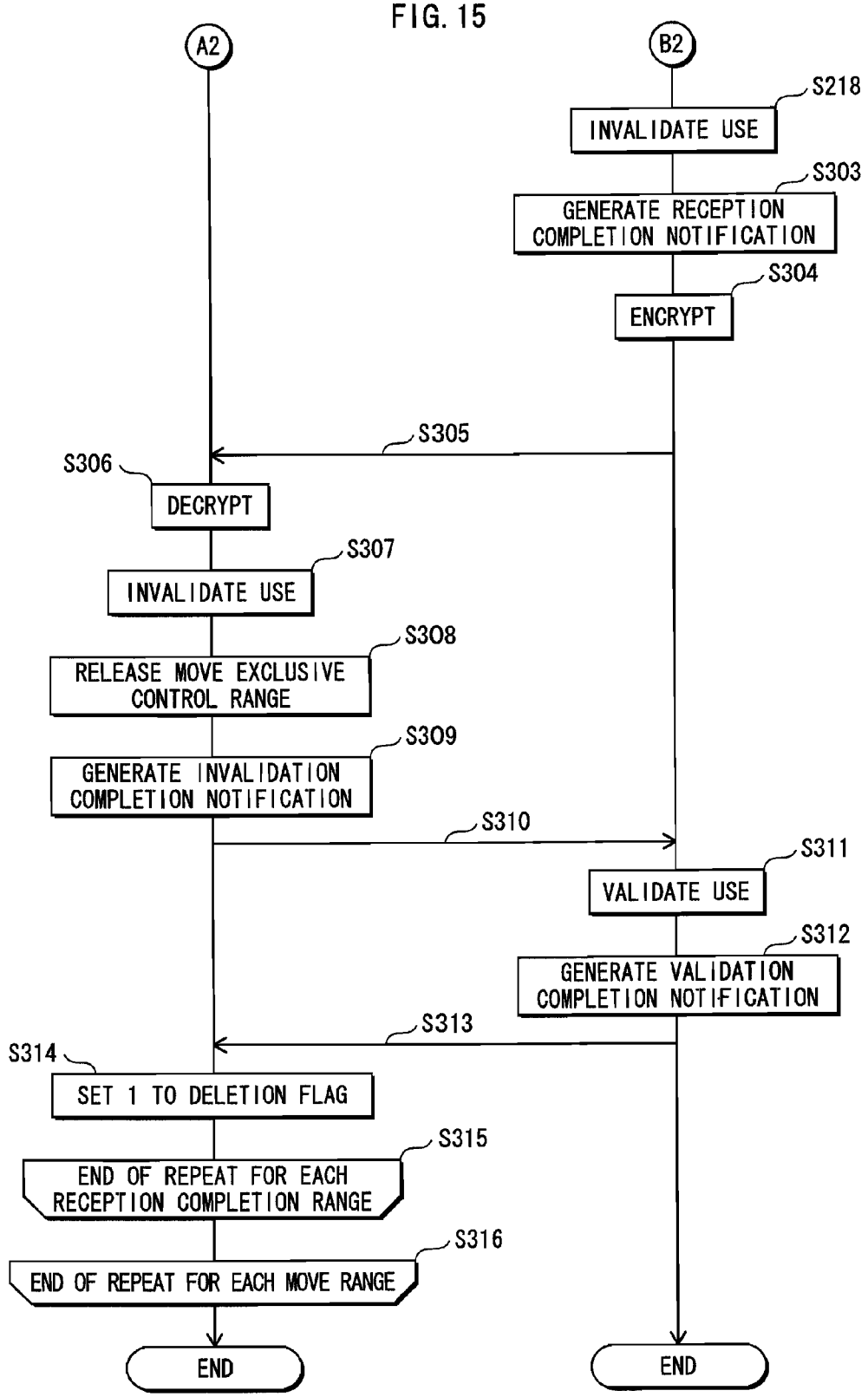

CONTENTS MANAGEMENT SYSTEM, AND CONTENTS MANAGEMENT DEVICE

BACKGROUND OF THE INVENTION

1. Technical Field

The present invention relates to a technology for delivering contents with consideration given to user convenience while protecting the copyrights of the contents.

2. Background Art

The Patent Document 1 discloses a technology to realize move of a content from a server device to a client device with use of DCTP (Digital Transmission Content Protection) standard and IEEE1394 serial buses.

Here, move of a content is a copyright protection technology which, by prohibiting the same content from being available for more than one use at the same time, allows the content to be moved to another device even in a case where the copy control information (hereinafter, referred to as "CCI") is set to "No More Copy".

In the above move process, the server device prevents the same content from being delivered to multiple client devices by, in a case when the move process is being performed between the server device and a client device, rejecting accesses from other client devices until the move process is completed.

Patent Document 1: Japanese Laid-Open Patent Application Publication No. 2003-22338

Non-Patent Document 1: Digital Transmission Content Protection Specification Volume 1 (Informational Version), Matsushita Electric Industrial Co, Ltd. et al, Revision 1.4, Feb. 28, 2005.

However, in a structure where an HDD recorder or the like is used as a home AVC server, and a plurality of contents stored in the home AVC server can be viewed from a plurality of home televisions and PCs (Personal Computers), the above-described prior art prohibits accesses from other client devices while the home AVC server is performing a move process to one client device. Accordingly, users of the other client devices are not able to perform move processes from the home AVC server, and furthermore, are not able to view a content, suffering a significant inconvenience.

The present invention was conceived in view of the above problems, and aims to provide a content management system and a content management device which are able to perform move processes with enhanced convenience for users of client devices which are not performing a move process.

SUMMARY OF THE INVENTION

In order to achieve the stated aim, the present invention provides a content management device which is connected to a plurality of terminal devices and moves a content to each of the terminal devices. The content management device comprises: a content storage unit storing at least one content; a move information management unit storing first range information including a first content identifier and a first range that are related to a content, a portion of which is in a move process to one of the terminal devices, the first content identifier being used for uniquely identifying the related content, and the first range corresponding to the portion; a range information receiving unit operable to receive, from one of the terminal devices which requests a move of a portion of a content, second range information including a second content identifier and a second range, the second content identifier being used for uniquely identifying the content, the portion of which is requested to be moved, and the second range corresponding to the portion requested to be moved; a judgement unit operable to make a judgement, using the first range information and the second range information, whether the first range and the second range overlap at least partially or not; and a control unit operable, if the judgement is negative, to permit the portion corresponding to the second range to be moved to the terminal device requesting the move.

EFFECTS OF THE INVENTION

According to the stated structure, during a move process, the content management device performs an exclusive control for each content and not for each of the terminal devices requesting a move. Accordingly, if the content requested to be moved is not in the move process, the content can be moved to the terminal device regardless of whether other contents are in a move process or not. Consequently, the content management device can perform a move process of a content without leaving the user of the terminal device in a stand-by status for the move process for a long period of time.

Note that a content in a move process to one of the terminal devices either has been moved to or is in a process of being moved to one of the terminal devices.

Furthermore, according to the stated structure, during the move process, the content management device performs the exclusive control for a portion of one content. Accordingly, if the portion to be moved is not in the move process, the portion can be moved to the terminal device regardless of whether other portions of the same content are in a move process or not. Consequently, the content management device is able to perform a move process of a content while ensuring convenience of the terminal device user.

If the portion corresponding to the second range is permitted to be moved, the move information management unit may further store the second range information as first range information.

According to the stated structure, the content management device can prevent the range permitted to be moved from being moved to a plurality of terminal devices by storing the information indicating the range permitted to be moved as the range which has been moved.

The content management device may further comprise: a move encryption key generating unit operable to generate a move encryption key and key identification information if the second range is permitted to be moved, the move encryption key being used for encrypting the second range, and the key identification information being used for uniquely identifying the move encryption key; and a move encryption key transmitting unit operable to transmit the move encryption key and the key identification information to the terminal device.

The content management device may further comprise: a move request receiving unit operable to receive, from the terminal device requesting the move, the move request which includes the key identification information; an encryption unit operable, upon reception of the move request, to read, from the content storage unit, the portion permitted to be moved and encrypt the read portion with use of the move encryption key; and a content transmitting unit operable to transmit part or an entirety of the encrypted portion to the terminal device requesting the move.

According to the stated structure, the content management device can move the above portion of the content to the terminal device safely and reliably.

The content management device may further comprise:
a key sharing unit operable to share a session key with the terminal device requesting the move; and a decryption unit operable to decrypt, with use of the session key, the second range information which was encrypted with use of the session key by and received from the terminal device requesting the move.

According to the stated structure, the content management device receives the second range information from the terminal device that shares the session key with the content management device. Thus, a move request from a malicious terminal device can be eliminated. Additionally, the content management device can prevent a malicious program from setting an unnecessary exclusive control range in the content management device for the purpose of attack.

The content management device may further comprise an invalidation unit operable, each time the part of the encrypted portion has been transmitted, to invalidate use of part, which corresponds to the transmitted part, of the portion in the content management device.

Each time the transmission of the part is completed and a notification of completion of a reception of the transmitted part is received from the terminal device that received the transmitted part, the invalidation unit may invalidate the use of the corresponding part in the content management device, and the content management device further comprises: a notification unit operable to send, to the terminal device to which the part was transmitted, a notification that the use of the corresponding part in the content management device has been invalidated.

According to the stated structure, the management device can perform move processes, with enhanced convenience for content use, by invalidating part of the content, the reception of which has been completed, in the order of completion.

The content management device may further comprise an invalidation unit operable, after the entirety of the encrypted portion corresponding to the second range has been transmitted, to invalidate use of the portion, which corresponds to the second range, in the content management device.

Each time the transmission of the entirety is completed and a notification of completion of a reception of the transmitted entirety is received from the terminal device that received the transmitted entirety, the invalidation unit may invalidate the use of the portion, which corresponds to the second range, in the content management device, and the content management device further comprises: a notification unit operable to send, to the terminal device to which the entirety was transmitted, a notification that the use of the corresponding entirety in the content management device has been invalidated.

According to the stated structure, every time the content management device completes a transmission of the read-out portion of the content from the content management device to the terminal device and receives a notification from the terminal device that the reception of the transmitted read-out portion is completed, the content management device invalidates use of the above portion in the content management device. This ensures use in accordance with a rule of the move process, which prohibits the same content from being available for more than one use at the same time.

The control unit above may change the second range such that the changed second range contains the second range and matches a data structure of the content, the portion of which is requested to be moved.

According to the stated structure, the content management device can easily read out the range to be moved to the terminal device.

If the judgement is affirmative, the control unit may perform a control such that a range of the content is permitted to be moved to the terminal device requesting the move, the range being within the second range and out of the first range.

According to the stated structure, the content management device can move a movable range of the content to the move-requesting terminal device while complying with the rule which prohibits the same content from being available for more than one use at the same time.

The present invention also provides a terminal device which receives a content from a content management device having the content. The terminal device comprises: a key sharing unit operable to share a session key with the content management device; a range information generating unit operable to generate range information including content identification information and a range, the content identification information being used for uniquely identifying the content, a portion of which was requested to be moved, and the range corresponding to the portion; an encryption unit operable to encrypt the range information with use of the session key; a range information transmitting unit operable to transmit the encrypted range information to the content management device; a key information receiving unit operable, if the portion is permitted by the content management device to be moved, to receive a move decryption key and key identification information, the move decryption key being used for decrypting the portion, and the key identification being used for uniquely identifying the move decryption key; a move request transmitting unit operable to transmit a move request including the key identification information to the content management device; a content receiving unit operable to receive, from the content management device, part or an entirety of the portion which has been encrypted; a decryption unit operable to decrypt the part or the entirety of the encrypted portion in accordance with the move decryption key; a reception completion range notification unit operable to notify the content management device of a range of the part or the entirety, a reception of which is completed; an invalidation notification reception unit operable to receive, from the content management device, an invalidation notification indicating that use of the part or the entirety in the content management device is invalidated; and a validation unit operable to validate, upon reception of the invalidation notification, use of the part or the entirety.

According to the stated structure, the terminal device is able to request for move of a portion of the content. As a result, the terminal device only needs to request the content management device to move the necessary portion of the content, allowing decrease in move processing time.

In addition, the terminal device is able to transmit/receive part or an entirety of the portion of the content to/from the content management device safely and reliably.

Furthermore, the terminal device invalidates the use of the range of the part or the entirety of the content after confirming that the use of the range in the terminal management is invalidated. This eliminates a possibility of the range being available for use by both the terminal device and the content management device at the same time, ensuring content use that abides by the rule related to the move process, which prohibits the same content from being available for more than one use at the same time.

Also, the terminal device can acquire the portion of the content it requires even in a case where the storage capacity of the terminal device is less than the entire content.

Also, the terminal device can acquire the portion of the content it requires even in a case where the storage capacity of the terminal device is less than the entire content.

The terminal device may further comprise: a key information receiving unit operable, if the range is permitted by the content management device to be moved, to receive a move decryption key and key identification information, the move decryption key being used for decrypting the portion, and the key identification being used for uniquely identifying the move decryption key; a move request transmitting unit operable to transmit a move request including the key identification information to the content management device; a content receiving unit operable to receive, from the content management device, part or an entirety of the range which has been encrypted; and a decryption unit operable to decrypt the part or the entirety of the encrypted range in accordance with the move decryption key.

Here, each time the content receiving unit completes receiving the part of the encrypted portion, the validation unit may validate use of the received part.

According to the stated structure, the terminal device can perform the move process with enhanced user convenience by validating the use of the ranges of the content in the order of reception.

Upon completion of receiving the entirety of the encrypted portion by the content receiving unit, the validation unit may validate use of the received entirety.

According to the stated structure, the terminal device invalidates the portion after receiving the entirety of the portion from the content management device, facilitating the validation process.

It should be noted the content storage unit of the content management device corresponds to a content storage unit 102 of a server device 10 in an embodiment which will be described later, the move information management unit corresponds to the move management information storage unit 113, the range information receiving unit corresponds to a communication unit 101, and the judgement unit and the control unit correspond to a move encryption key generating unit 114.

Also, the move encryption key generating unit corresponds to a move encryption key generating unit 116 of the server device 10, and the move encryption key transmitting unit corresponds to a move request response creating unit 115 and the communication unit 101.

Also, the move request receiving unit and the encryption unit correspond to a content processing unit 117 of the server device 10, and the content transmitting unit corresponds to the communication unit 101.

Additionally, the key sharing unit corresponds to an authentication key exchange unit 111 of the server device 10, and the decryption unit corresponds to the decryption unit 112.

Likewise, the invalidation unit corresponds to a use management unit 118 of the server device 10.

Further, the key-sharing unit of the terminal device corresponds to an authentication key exchange unit 211 of a client device 20 in the embodiment, the range information generating unit corresponds to a move request creating unit 212, the encryption unit corresponds to an encryption unit 213, and the range information transmitting unit corresponds to a communication unit 201.

Also, the key information receiving unit corresponds to the communication unit 201 of the client device 20, the move request transmitting unit corresponds to the content processing unit 216 and the communication unit 201, and the decryption unit corresponds to a decryption unit 214.

Additionally, the validation unit corresponds to a use management unit 217 of the client device 20.

BRIEF DESCRIPTION OF THE DRAWINGS

FIG. 2 is a functional block diagram showing a structure of a server device 10 in terms of functions;

FIG. 3A shows a content A (120); FIG. 3B shows a content B (130);

FIG. 4 shows a data structure of a content list 220;

FIG. 5 shows a data structure of a move management table 150;

FIG. 6 shows a data structure of a move management table 150a;

FIG. 7 shows a data structure of a move management table 150b;

FIG. 8 shows a data structure of a use management table 180;

FIG. 10 shows a data structure of a move request 230;

FIG. 11 shows a data structure of a move encryption key table 240;

FIG. 12 shows a data structure of a use management table 250;

FIG. 13 is a flowchart showing operations of the content management system 1 (to be continued to FIG. 14);

FIG. 14 is a flowchart showing the operations of the content management system 1 (continued from FIG. 13 and to be continued to FIG. 15); and FIG. 15 is a flowchart showing the operations of the content management system 1 (continued from FIG. 14).

DESCRIPTION OF REFERENCE NUMERALS

Figure 1:
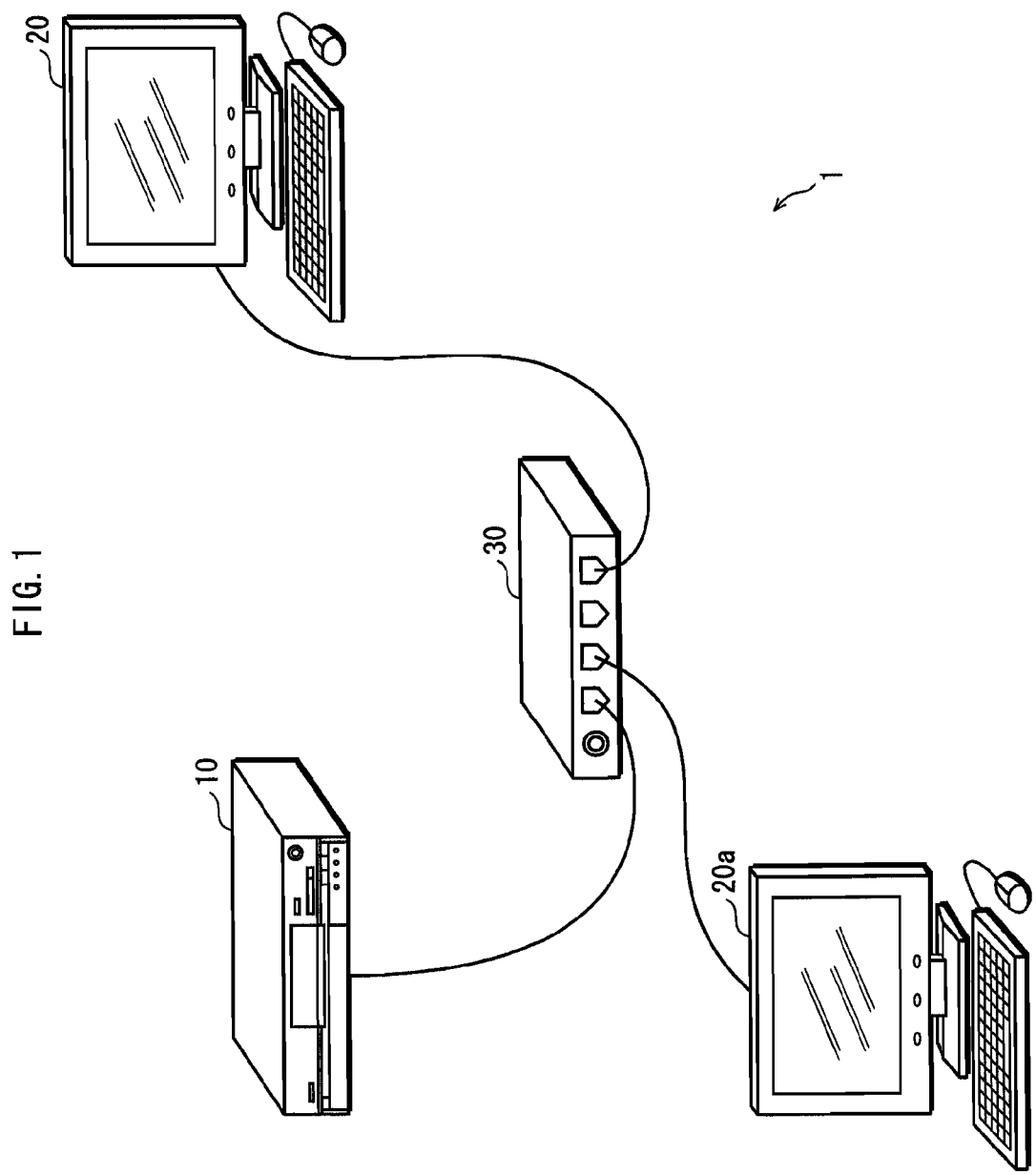
FIG. 1 shows a system structure of a content management system 1.

1 . . . content management system
10 . . . server device
20 . . . client device
20a . . . client device
30 . . . hub
101 . . . communication unit
102 . . . content storage unit
103 . . . content management unit
111 . . . authentication key exchange unit
112 . . . decryption unit
113 . . . move management information storage unit
114 . . . move exclusive control unit
115 . . . move request response creating unit
116 . . . move encryption key generating unit
117 . . . content processing unit
118 . . . use management unit
201 . . . communication unit
202 . . . content storage unit
203 . . . content management unit
211 . . . authentication key exchange unit
212 . . . move request creating unit
213 . . . encryption unit
214 . . . decryption unit
215 . . . move encryption key storage unit
216 . . . content processing unit
217 . . . use management unit

DETAILED DESCRIPTION OF THE INVENTION

A content management system 1 will be described as an embodiment of the present invention with reference to the drawings.

<Outline of Embodiment>

FIG. 1 shows a system structure of a content management system 1. As shown in FIG. 1, the content management system 1 includes a server device 10, a client device 20, a client device 20a, and a hub 30. The server device 10, the client device 20, and the client device 20a are interconnected via the hub 30. Here, an example of the server device 10 is a hard disk drive recorder, and an example of the client device 20 and the client device 20a is a personal computer.

The server device 10 stores a content with CCI set to "No More Copy". The client device 20 and the client device 20a request the server device 10 to move the content.

Here, each client device requests the server device 10 to move part of the content (hereinafter, referred to as "partial content") by specifying content range information which indicates the part of the content.

The server 10 determines whether or not it is possible to move the partial content requested to be moved, and if it is possible, moves the requested partial content to the client device.

It should be noted that in the present embodiment, it is assumed that the server device 10 has already received the request from the client device 20a, permitted the partial content to be moved to the client device 20a, and is currently processing the move operation. It is also assumed that at this point, the server device 10 receives a move request for a partial content from the client device 20.

<Structure>

In the following, detailed description will be given on an internal structure of the server device 10 and the client device 20. It should be noted that a description on the internal structure of the client device 20a is omitted as it is identical to that of the client device 20.

1. Server Device 10

FIG. 2 is a functional block diagram showing a structure of a server device 10 in terms of functions. As shown in FIG. 2, the server device 10 includes a communication unit 101, a content storage unit 102, and a content management unit 103.

The content management unit 103 includes an authentication key exchange unit 111, a decryption unit 112, a move management information storage unit 113, a move exclusive control unit 114, a move request response creating unit 115, a move encryption key generating unit 116, a content processing unit 117, and a use management unit 118.

It should be noted that specifically, the server device 10 is a computer system including a microprocessor, a ROM, a RAM, a hard disk unit and the like. A computer program is stored in the ROM, RAM, or hard disk unit, and the server device 10 achieves its functions as the microprocessor operates in accordance with the computer program.

In the following, each structure component of the server device 10 will be described.

(1) Communication Unit 101

The communication unit 101 includes a network connection unit and the like and transmits/receives information to/from the client device 20 and the client device 20a via the hub 30.

(2) Content Storage Unit 102

The content storage unit 102 specifically includes a hard disk unit and the like, and has a storage region for storing at least one content and a content list.

It should be noted that in the present embodiment, the content storage unit 102 stores two contents, a content A and a content B, as an exemplary case.

FIG. 3A shows a content A (120); FIG. 3B shows a content B (130).

As shown in FIG. 3A, the content A (120) includes CCI (121) which is set to "No More Copy" and CNT_DATA_A (122). In this case, specifically, the CNT_DATA_A (122) is data generated from video data by compression coding in accordance with MPEG-2 (Moving Picture Experts Group phase 2).

As shown in FIG. 3B, the content B (130) includes a CCI (131) which is set to "No More Copy" and CNT_DATA_B (132). The CNT_DATA_B (132) is, as is the case with the CNT_DATA_A (122), data generated from video data by compression coding in accordance with MPEG-2 (Moving Picture Experts Group phase 2).

The content A (120) and the content B (130) are both divided into a plurality of partial contents. In the present embodiment, a partial content composes a part of a content and, for users, is a meaningful series of data for viewing. For example, if the content is a series of TV dramas, the partial content is a drama piece composing the series of the TV dramas.

Here, in FIGS. 3A and 3B, a range A1 (123) and a range A2 (124) in the content A (120), and a range B1 (133) in the content B (130) each indicate a partial content requested by the client device 20 to be moved. The range A1 (123) is from 2000 bytes to 3999 bytes, counting from the starting position of the CNT_DATA_A (122); the range A2 (124) is from 10000 bytes to 11999 bytes, counting from the starting position of the CNT_DATA_A (122); and the range B1 (133) is from 9000 bytes to 10999 bytes, counting from the starting position of the CNT_DATA_B (132). These ranges will be described in detail later.

Next, FIG. 4 shows a data structure of a content list 220.

As shown in FIG. 4, the content list 220 contains a plurality of pieces of content information. Each piece of content information indicates a movable partial content stored in the content storage unit 102, and includes a content name, a partial content name, content identification information, and content range information. For example, content information 221 includes "content A" as the content name, "drama(1)" as the partial content name, "http://192.168.0.1/contentsA.mpg" as the content identification information, and "0-1999" as the content range information. In the present embodiment, a URI (Uniform Resource Identifier) of the content is used as the content identification information, and a byte position from the starting position of the content is used as the content range information. For example, the content range information "0-1999" indicates a range from 0 byte to 1999 bytes, counting from the starting position of the content.

After the server device 10 moves the partial content to the client device 20 and the client device 20a, the content processing unit 117 deletes, from the content list stored in the content storage unit 102, the piece of content information corresponding to the moved partial content. In other words, the content list is updated every time a partial content is moved.

The content list stored in the content storage unit 102 is transmitted to the client device 20 and the client device 20a. The content list can be transmitted to each client device upon being updated or regularly regardless of whether being updated or not. The client device 20 and the client device 20a can refer to the newest content list transmitted from the server device 10 and select a partial content to be requested to be moved.

(3) Content Management Unit 103

The content management unit 103 controls move processing of the content stored in the content storage unit 102.

In the following, each of the functional blocks included in the content management unit 103 will be described.

(a) Authentication Key Exchange Unit 111

The authentication key exchange unit 111 and an authentication key exchange unit 211 of the client device 20 authenticate each other and share a session key. The authentication key exchange unit 111 outputs the session key shared with the authentication key exchange unit 211 to the decryption unit 112 and the move request response creating unit 115.

It should be noted that a detailed description on Authentication and Key Exchange processing executed by the authentication key exchange unit 111 is omitted as this processing can be realized with use of a known technology such as challenge-response.

(b) Decryption Unit 112

The decryption unit 112 receives an encrypted move request from the communication unit 101. Here, the encrypted move request is encrypted data which was generated by applying an encrypting algorithm $E_1$ to a move request. Here, the move request includes at least one pair of content identification information and content range information. Additionally, one example of the encrypting algorithm $E_1$ is DES (Data Encryption Standard).

Also, the decryption unit 112 receives the session key from the authentication key exchange unit 111. The decryption unit 112 uses the session key as a decryption key, decrypts the move request by applying a decrypting algorithm $D_1$ to the encrypted move request, and the transmits the decrypted move request to the move exclusive control unit 114.

Here, the decrypting algorithm $D_1$ is an algorithm for deciphering the encrypted text which was encrypted using the encrypting algorithm $E_1$.

(c) Move Management Information Storage Unit 113

The move management information storage unit 113 stores information related the content which is in the move process while the server device 10 is moving the content to the client device 20 or the client device 20a. Specifically, the move management information storage unit 113 manages the content in the move process with use of a move management table.

FIG. 5 shows a data structure of a move management table 150 stored in the move management information storage unit 113 in an exemplary case where the server device 10 is moving two partial contents to the client device 20a.

The move management table 150 includes move management information 151 and move management information 152. Each move management information includes a move exclusive control range field, a move encryption key field, and an encryption key identification information field, and corresponds to the partial content in the move process on one-to-one basis.

The move exclusive control range field describes the content identification information and the content range information (hereinafter, a combination of the content identification information and the content range information may be referred to as "move range"). In the present embodiment, as described above, the URI of the content is used as the content identification information, and the byte position from the starting position of the content is used as the content range information. In other words, the move range enables the partial content in the move process from the server device 10 to the client device to be uniquely identified.

Specifically, the move exclusive control range contained in the move management information 151 includes the content identification information "http://192.168.0.1/contentsA.mpg" and the content range information "bytes=9000-10999". Also, the move exclusive control range contained in the move management information 152 includes the content identification information "http://192.168.0.1/contentsB.mpg" and the content range information "bytes=2000-3999".

It should be noted that the description "bytes=9000-10999" indicates a range of 9000 bytes to 10999 bytes from the starting position of the content. Similarly, the description "bytes=2000-3999" indicates a range of 2000 bytes to 3999 bytes from the starting position of the content.

The move encryption key is key information generated by the move encryption key generating unit 116, which will be described later, and is used to encrypt the partial content during the move process. A specific example is a move encryption key "$K_{move}\_01$" included in the move management information 151, which is key information used to encrypt the partial content specified by the content identification information "http://192.168.0.1/contentsA.mpg" and the content range information "bytes=9000-10999".

The encryption key identification information is information for uniquely identifying the move exclusive control range and the move encryption key.

(d) Move Exclusive Control Unit 114

The move exclusive control unit 114 receives the move request from the decryption unit 112. Upon receiving the move request, the move exclusive control unit 114 reads out the move management table from the move management information storage unit 113.

The move exclusive control unit 114 additionally writes the move range included in the move request into the move exclusive control range field of the read-out move management table.

For example, in a case where the move management table read out from the move management information storage unit 113 is the move management table 150 in FIG. 5, and the move range included in the received move request indicates "http://192.168.0.1/contentsA.mpg" and "bytes=2000-3999", "http://192.168.0.1/contentsA.mpg" and "bytes=10000-11999", and "http://192.168.0.1/contentsB.mpg" and "bytes=9000-10999", the move exclusive control unit 114 additionally writes each move range into the move exclusive control range field of the move management table 150, generating a move management table 150a as shown in FIG. 6. In the move management table 150a, move ranges 161, 162, and 163 are added to the move exclusive control range fields of the move management table 150.

It should be noted that in the move encryption key fields and the encryption key identification information fields which correspond to the added move ranges 161, 162, and 163, nothing is described until it is determined whether the move process can be performed or not.

The move exclusive control unit 114 determines whether the move ranges which are newly written into the move exclusive control range fields of the move management table and the move exclusive control ranges which have been already written into the move management table overlap with each other or not. A specific example will be described using the move management table 150a shown in FIG. 6. The move exclusive control unit 114 determines that whether each of the move ranges 161, 162, and 163 overlaps with the move exclusive control range "http://192.168.0.1/contentsA.mpg" and "bytes=9000-10999" included in the move management information 151, and the move exclusive control range "http://192.168.0.1/contentsB.mpg" and "bytes=2000-3999" included in the move management information 152. In this case, since the move range 162 overlaps with the move exclusive control range included in the move management information 151, the move range 162 is determined to be overlapping, and the move ranges 161 and 163 are determined to be not overlapping.

If it is determined that the move range requested by the client device 20 overlaps with the move exclusive control range, the move exclusive control unit 114 determines that the overlapped partial content cannot be moved to the client device 20 as the overlapped partial content is currently in the move process. The move exclusive control unit 114 deletes, from the move management table, the move range related to the partial content which was determined unable to be moved. In the above-described specific example, the move range 162 is deleted from the move management table 150a.

If it is determined that the move range requested by the client device 20 does not overlap with the move exclusive control range, the move exclusive control unit 114 determines that the partial content which is not overlapped can be moved to the client device 20 as the partial content is not currently in the move process.

The move exclusive control unit 114 outputs movability information, which indicates the result of the above-described determination, to the move request response creating unit 115. Also, if the above result indicates that the partial content can be moved, the move exclusive control unit 114 notifies the move encryption key generating unit 116 accordingly.

The move exclusive control unit 114 receives the move encryption key and the encryption key identification information from the move encryption key generating unit 116, writes these into the move encryption key field and the encryption key identification information field of the move management table.

FIG. 7 shows a move management table 150b which is generated in the case where the move exclusive control unit 114 has determined that the partial content indicated by the move range 162 is unmovable, and the partial contents indicated by the move ranges 161 and 163 are movable. The move management table 150b has a structure in which new pieces of move management information 171 and 172 are added to the move management table 150 shown in FIG. 5. The move encryption key and the encryption key identification information included in each piece of move management information are generated by the move encryption key generating unit 116.

(e) Move Request Response Creating Unit 115

The move request response creating unit 115 receives, from the move exclusive control unit 114, the movability information indicating whether each partial content requested to be moved is movable or not. Also, the move request response creating unit 115 receives from the move encryption key generating unit 116 the move encryption key and the encryption key identification information which correspond to each partial content.

The move request response creating unit 115 crates a move request response in which the range information corresponds with the movability information, move encryption key, and the encryption key identification information, if the movability information received from the move exclusive control unit 114 indicates that the partial content is movable.

The move request response creating unit 115 crates a move request response in which the range information corresponds with the movability information, if the movability information received from the move exclusive control unit 114 indicates that the partial content is unmovable.

The move request response creating unit 115 encrypts the created move request response using the session key received from the authentication key exchange unit 111. The move request response creating unit 115 then transmits the encrypted move request response to the client device 20 via the communication unit 101.

(f) Move Encryption Key Generating Unit 116

Upon receiving, from the move exclusive control unit, the information indicating that the partial content is movable, the move encryption key generating unit 116 generates the move encryption key and the encryption key identification information which can uniquely identify the move encryption key.

The move encryption key generating unit 116 outputs the generated move encryption key and the encryption key identification information to the move exclusive control unit 114.

(g) Content Processing Unit 117

The content processing unit 117 receives a move content acquisition request from the client device 20 via the communication unit 102. The move content acquisition request includes the encryption key identification information.

The content processing unit 117 extracts, from the move management table stored in the move management information storage unit 113, the piece of move management information which includes the encryption key identification information corresponding to the encryption key identification information in the received move content acquisition request.

The content processing unit 117 reads out the content identification information, content range information, and move encryption key from the extracted piece of move management information.

The content processing unit 117 reads out, from the content storage unit 102, the partial content identified by the content identification information and the content range information.

The content processing unit 117 generates an encrypted partial content by encrypting the partial content using the move encryption key. The content processing unit 117 transmits the generated encrypted partial content to the client device 20 via the communication unit 101.

Also, the content processing unit 117 receives an encrypted reception completion notification from the client device 20 via the communication unit 101. The content processing unit 117 decrypts the encrypted reception completion notification with use of the move encryption key and acquires the reception completion notification. The content processing unit 117 extracts, from the acquired reception completion notification, the content identification information and the content range information which indicate the reception completion range, and outputs the extracted content identification information and the content range information to the use management unit 118. It should be noted that details of the reception completion notification will be given in description of operations.

If a use management table 180 stored in the use management unit 118 includes a piece of use management information, the deletion flag field of which has "1" set therein, the content processing unit 117 deletes, from the content storage unit 102, the partial content corresponding to the transmission completion range included in this piece of use management information. Further, the content processing unit 117 deletes the piece of content information related to the above partial content from the content list.

(h) Use Management Unit 118

The use management unit 118 has a function to manage use of the partial content in the move process.

The use management unit 118 manages the use of the partial content, for example, by using the use management table 180 shown in FIG. 8. The use management table 180 includes use management information 181 and 182. Each use management information includes a transmission completion range field, a use flag field, and the deletion flag field.

Upon receiving, from the content processing unit 117, the content identification information and the content range information included in the reception completion notification, the use management unit 118 generates the use management information.

The use management unit 118 describes, in the transmission completion range field, the content identification information and the content range information received from the content processing unit 117.

In the use flag field, either a value "0" or "1" is described. "0" indicates that the use of the partial content in the server device 10, which is indicated by the corresponding transmission completion range, is permitted, and "1" indicates that the use of the corresponding partial content in the server device 10 is prohibited.

In the deletion flag field, either a value "0" or "1" is described. "0" indicates that the deletion of the partial content indicated by the corresponding transmission completion range is prohibited, and "1" indicates that the deletion of the partial content is permitted.

The use management unit 118 manages use of the partial content based on the value described in the use flag field and the value described in the deletion flag field. Setting of each flag value will be mentioned in the description of the operations.

2. Client Device 20

Figure 9:
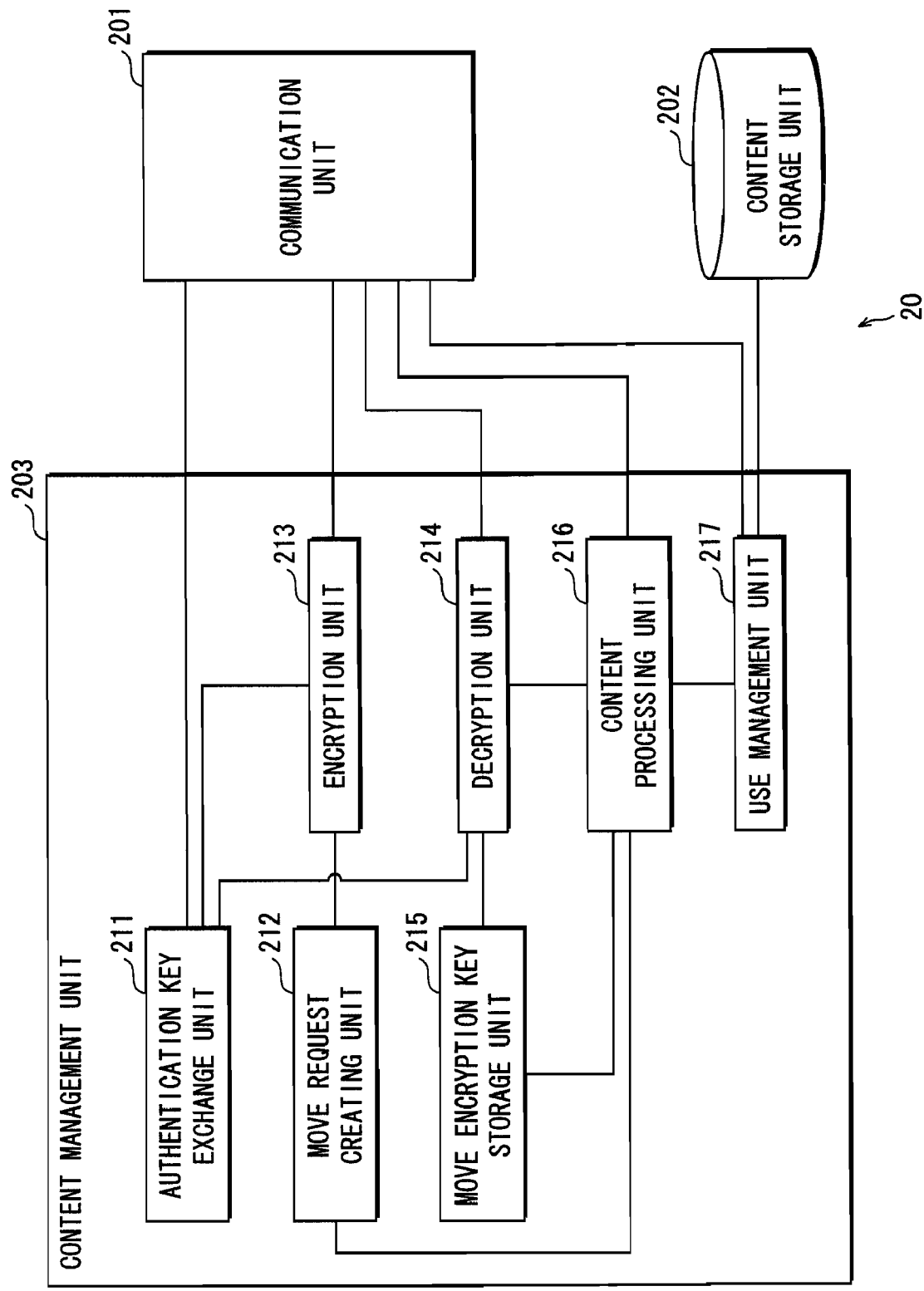
FIG. 9 is a functional block diagram showing a structure of a client device 20 in terms of functions.

Next, a structure of the client device 20 will be described. FIG. 9 is a functional block diagram showing a structure of a client device 20 in terms of functions. As shown in FIG. 9, the client device 20 includes a communication unit 201, a content storage unit 202, and a content management unit 203.

The content management unit 203 includes an authentication key exchange unit 211, a move request creating unit 212, an encryption unit 213, a decryption unit 214, a move encryption key storage unit 215, a content processing unit 216, and a use management unit 217.

It should be noted that specifically, the client device 20 is a computer system including a microprocessor, a ROM, a RAM, a hard disk unit and the like. A computer program is stored in the ROM, RAM, or hard disk unit, and the client device 20 achieves its functions as the microprocessor operates in accordance with the computer program.

The following describes each structure component of the client device 20.

(1) Communication Unit 201

The communication unit 201 includes a network connection unit and the like and transmits/receives information to/from the server device 10 via the hub 30.

(2) Content Storage Unit 202

The content storage unit 202 specifically includes a hard disk unit and the like, and has a storage region for storing at least one content and a content list.

As described above, the content list is transmitted from the server device 10 every time the server device 10 updates the content list stored in the content storage unit 102 or on a regular basis. The content storage unit 202 receives the content list transmitted by the server device 10 via the communication unit 201 and updates the content list by overwriting the stored content list with the received content list.

Description on the content of the content list is omitted as it is the same as the one described using FIG. 4.

(3) Content Management Unit 203

The content management unit 203 controls the move process, of the content stored in the content storage unit 102 of the server device 10, to the client device 20 itself.

The following describes each functional block included in the content management unit 203.

(a) Authentication Key Exchange Unit 211

The authentication key exchange unit 211 and the authentication key exchange unit 111 of the server device 10 authenticate each other and share the session key. The authentication key exchange unit 211 outputs the session key shared with the authentication key exchange unit 111 to the encryption unit 213 and the decryption unit 214.

It should be noted that a detailed description on Authentication and Key Exchange processing executed by the authentication key exchange unit 211 is omitted as this processing can be realized with use of a known technology such as the challenge-response.

(b) Move Request Creating Unit 212

The move request creating unit 212 receives a content list display instruction from a user input. Upon receiving the content list display instruction, the move request creating unit 212 reads out the content list from the content storage unit 202 and displays the read-out content list on a display.

Following that, the user specifies the partial content requested to be moved by referring to the contents of the content list displayed on the display and specifying a piece of content information. It should be noted that, in the present embodiment, the client device 20 is capable of requesting the server device 10 to move multiple partial contents simultaneously as a result of the move request creating unit 212 receiving a specification of multiple pieces of content information from the user.

The move request creating unit 212 extracts the content identification information and the content range information from all of the specified pieces of content information in the content list stored in the content storage unit 202 and creates the move request including all the extracted content identification information and content range information.

As a move request 230 in FIG. 10 shows an example, the move request is data including at least one piece of identification information and content range information in one-to-one correspondence. It should be noted that, as described above, a set of the content identification information and the content range information may be referred to as the move range.

The move request creating unit 212 outputs the created move request to the encryption unit 213.

(c) Encryption unit 213

The encryption unit 213 receives the session key from the authentication key exchange unit 211 and retains it. Also the encryption unit 213 receives the move request from the move request creating unit 212. The encryption unit 213 generates the encrypted move request by applying the encrypting algorithm $E_1$ to the received move request with use of the session key as the encryption key. Next, the encryption unit 213 transmits the generated encrypted move request to the server device 10 via the communication unit 201.

(d) Decryption Unit 214

The decryption unit 214 receives the session key from the authentication key exchange unit 211 and retains it. Also, the decryption unit 214 receives the encrypted move request response, which was encrypted by the server device 10 with use of the session key, from the server device 10 via the communication unit 201. The decryption unit 214 acquires the move request by applying the decrypting algorithm $D_1$ to the received encrypted move request response with use of the session key as the decryption key.

The decryption unit 214 extracts the move range, the move encryption key, and the encryption key identification information from the acquired move request response and outputs each of the extracted information to the move encryption key storage unit 215.

(e) Move Encryption Key Storage Unit 215

The move encryption key storage unit 215 receives, from the decryption unit 214, the move range, the move encryption key, and the encryption key identification information extracted from the move request response. The move encryption key storage unit 215 generates a move encryption key table 240 based on each of the received information and retains it.

As shown in FIG. 11, the move encryption key table 240 contains two pieces of move encryption key information, and each move encryption key information includes the move range, move encryption key, and the encryption key identification information.

(f) Content Processing Unit 216

The content processing unit 216 requests, with use of the encryption key identification information stored in the move encryption key storage unit 215, the server device 10 to move the partial content.

Specifically, the content processing unit 216 selects one piece of encryption key identification information from the move encryption key table 240. The content processing unit 216 extracts the selected piece of encryption key identification information from the move encryption key table 240 and creates a content acquisition request including the extracted encryption key identification information. After that, the content processing unit 216 transmits the created content acquisition request to the server device 10 via the communication unit 201.

In response to the above transmission, the content processing unit 216 acquires, from the server device 10 via the communication unit 201, the encrypted partial content which corresponds to the partial content specified by the above-described move content acquisition request and was encrypted based on the move encryption key.

Upon acquiring the encrypted partial content, the content processing unit 216 reads out, from the move encryption key table 240 of the move encryption key storage unit 215, the move encryption key specified by the selected piece of encryption key identification information and acquires the partial content by decrypting the encrypted partial content with use of the read-out move encryption key. The content processing unit 216 stores the acquired partial content in the content storage unit 202.

Further, the content processing unit 216 reads out, from the move encryption key table 240, the content identification information and the content range information for identifying the acquired partial content and outputs the read-out content identification information and the content range information to the use management unit 217.

(g) Use Management Unit 217

Upon reception of the content identification information and the content range information for identifying the partial content, which were acquired from the server device 10 by the content processing unit 216, the use management unit 217 generates a piece of use management information including the received content identification information and the content range information and adds the generated piece of use management information to the use management table 250 shown in FIG. 12. It should be noted that "0" is described in the use flag field when a piece of use management information is generated.

After that, the use management unit 217 generates a reception completion notification including the content identification information and the content range information contained in the generated piece of use management information. Following that, the use management unit 217 encrypts the generated reception completion notification in accordance with the move encryption key. The use management unit 217 transmits the encrypted reception completion notification to the server device 10 via the communication unit 201.

<Operations>

In the following, operations of the content management system 1 will be described with reference to a flowchart shown in FIGS. 13 to 15.

Here, it is assumed that the client device 20 has already acquired the content list from the served device 10 and acquired, by the user input, the specification of the partial contents to be moved.

The authentication key exchange unit 211 of the client device 20 transmits a mutual authentication request to the authentication key exchange unit 111 of the server device 10, and the authentication key exchange unit 111 and the authentication key exchange unit 211 conduct a mutual authentication, sharing the session key (step S101).

The authentication key exchange unit 111 transmits the session key to the decryption unit 112 and the move request response creating unit 115. The authentication key exchange unit 211 transmits the session key to the encryption unit 213 and the decryption unit 214.

Following that, the move request creating unit 212 extracts pieces of content information which correspond to all the partial contents specified by the user input (step S102) and generates a move request including the content identification information and the content range information contained in each piece of content information (step S103). The move request creating unit 212 transmits the generated move request to the encryption unit 213.

The encryption unit 213 encrypts the move request received from the move request creating unit 212, generating the encrypted move request (step S104). The encryption unit 213 transmits the encrypted move request to the server device 10 via the communication unit 201, and the communication unit 101 of the server device 10 receives the encrypted move request (step S105).

The decryption unit 112 of the server device 10 receives the encrypted move request via the communication unit 101 and decrypts the received encrypted move request with use of the session key received from the authentication key exchange unit 111 (step S106).

The decryption unit 112 transmits the move request, which was acquired by performing the decryption, to the move exclusive control unit 114.

Upon reception of the move request, the move exclusive control unit 114 adds, to the move exclusive control range field of the move management table 150 retained by the move management information storage unit 113, the move range composed of the content identification information and the content range information which are included in the above-described move request (step S107).

Next the move exclusive control unit 114 repeats steps from S108 to S114 for each of the added move ranges.

First, the move exclusive control unit 114 determines whether or not the added move range overlaps with each of the move ranges which have been described, before the addition, in the move management table 150 (step S109).

When there is overlapping (YES at the step S109), the move exclusive control unit 114 determines that the partial content indicated by the added move range is unmovable (step S110).

When there is no overlapping (NO at the step S109), the move exclusive control unit 114 determines that the partial content indicated by the added move range is movable (step S111), and (i) outputs a move encrypting key generation instruction to the move encryption key generating unit 116 and (ii) outputs the move range to the move request response creating unit 115.

Also, the move exclusive control unit 114 outputs to the move request response creating unit 115 the movability information indicating whether the partial content is movable or not.

Upon reception of the move encryption key generation instruction from the move exclusive control unit 114, the move encryption key generating unit 116 generates the move encryption key corresponding to the move range (step S112) and, further, generates the encryption key identification information for identifying the move encryption key (step S113).

The move encryption key generating unit 116 (i) writes the generated move encryption key into the move encryption key field in the move management table 150 and (ii) writes the generated encryption key identification information into the encryption key identification information field. Also, the move encryption key generating unit 116 notifies the move request response creating unit 115 of the generated move encryption key and the encryption key identification information.

The move request response creating unit 115 receives the movability information and the move range from the move exclusive control unit 114 and receives the move encryption key and the encryption key identification information from the move request response creating unit 115. The move request response creating unit 115 generates the move request response from these information (step S201). The move request response creating unit 115 encrypts the generated move request response using the session key acquired from the authentication key exchange unit 111, generating the encrypted move request response (step S202).

The move request response creating unit 115 transmits the generated encrypted move request response to the client device 20 via the communication unit 101, and the communication unit 201 of the client device 20 receives the encrypted move request response (step S203).

Upon reception of the encrypted move request response via the communication unit 201, the decryption unit 214 of the client device 20 decrypts the encrypted move request response using the session key acquired from the authentication key exchange unit 211 (step S204), acquiring the move request response. The decryption unit 214 extracts, from the acquired move request responses, the move range, move encryption key, and the encryption key identification information related to all the partial contents which are indicated, by the movability information, to be movable, and outputs each piece of the extracted information to the move encryption key storage unit 215.

Upon reception of the each piece of information mentioned above from the decryption unit 214, the move encryption key storage unit 215 generates the move encryption key table 240 and stores the generated move encryption key table 240 therein (step S205).

Following that, the server device 10 and the client device 20 repeat steps from S206 to S316 for each of the move ranges included in the move encryption key table 240 stored in the move encryption key storage unit 215.

The content processing unit 216 receives, among the multiple pieces of move encryption key information included in the move encryption key table 240, a selection of a piece of move encryption key information (step S207). It should be noted that the content processing unit 216 may receive the selection of a piece of move encryption key information by a user input or may be configured to automatically select a piece of move encryption key information sequentially from the top of the move encryption key table 240.

The content processing unit 216 extracts the encryption key identification information from the selected move encryption key information and generates a move content acquisition request including the extracted encryption key identification information (step S208). The content processing unit 216 transmits the generated move content acquisition request to the communication unit 201.

The communication unit 201 transmits the move content acquisition request to the server device 10, and the communication unit 101 of the server device 10 receives the move content acquisition request (step S209).

The content processing unit 117 of the server device 10 specifies, in the move management table 150b stored in the move management information storage unit 113, the move management information which includes the received encryption key identification information and specifies the move encryption key identified by the encryption key identification information (step S210).

The content processing unit 117 extracts, from the move management table 150b, the move encryption key specified in the step S210 and further extracts the corresponding content identification information and content range information.

The content processing unit 117 reads out, from the content storage unit 102, the partial content specified by the extracted content identification information and content range information (step S211). After that, the content processing unit 117 sets CCI to "No More Copy" on the read-out partial content (step S212).

The content processing unit 117 generates the encrypted partial content by applying an encrypting algorithm $E_2$ to the partial content with use of the extracted move encryption key as the encryption key (step S213). The content processing unit 117 generates move content transmission data including the encrypted partial content (step S214). The content processing unit 117 transmits the generated move content transmission data to the communication unit 101.

The communication unit 101 transmits the move content transmission data to the client device 20, and the communication unit 201 of the client device 20 receives the move content transmission data (step S215).

Following the above, the server device 10 and the client device 20 repeat steps from S216 to S315 for each reception completion range.

The decryption unit 214 of the client device 20 sequentially receives the move content transmission data via the communication unit 201 and extracts the encrypted partial content included in the reception completion range. Following that, the decryption unit 214 extracts, from the move encryption key storage unit 215, the move encryption key corresponding to the encrypted partial content.

The decryption unit 214 acquires the partial content by applying a decrypting algorithm $D_2$ to the encrypted partial content with use of the extracted move encryption key as the decryption key (step S217). It should be noted that the decrypting algorithm $D_2$ is an algorithm for deciphering the encrypted text which was encrypted using the encrypting algorithm $E_2$.

Upon decryption of the partial content included in the reception completion range by the decryption unit 214, the content processing unit 216 notifies the user management unit 217 of the content identification information and the content range information indicating the reception completion range.

Having received the content identification information and the content range information from the content processing unit 216, the use management unit 217 generates a new piece of use management information by writing, in the reception completion range field of the use management table 250, the received content identification information and content range information.

Following the above, the use management unit 217 invalidates use of the reception completion range decrypted in the step S217 by setting "1" in the use flag field of the generated piece of use management information (step S218).

Next, the content processing unit 216 generates the reception completion notification which includes the content identification information and the content range information (step S303). Further, the content processing unit 216 acquires the corresponding move encryption key from the move encryption key storage unit 215. The content processing unit 216 encrypts the reception completion notification using the move encryption key as the encryption key (step S304).

The communication 201 receives the encrypted reception completion notification from the content processing unit 216 and transmits it to the server device 10, and the communication unit 101 of the server device 10 receives the encrypted reception completion notification (step S305).

Upon reception of the reception completion notification via the communication unit 101, the content processing unit 117 of the server device 10 decrypts the encrypted reception completion notification using the move encryption key as the decryption key (step S306), acquiring the reception completion notification. The content processing unit 117 extracts, from the acquired reception completion notification, the content identification information and the content range information, and notifies the use management unit 118 of the extracted content identification information and the content range information.

The use management unit 118 generates a new piece of use management information by writing, in the transmission completion range field of the use management table 180, the content identification information and the content range information received from the content processing unit 117.

The use management unit 118 invalidates use of the transmission completion range by setting "0" in the use flag field of the generated use management information (step S307), and further, prohibits deletion of the transmission completion range by setting "1" in the deletion flag field.

Next, the use management unit 118 releases the move exclusive control range by deleting, from the move management table stored in the move management information storage unit 113, the content identification information and the content range information from the move management information which has the content identification information and the content range information included in the generated piece of use management information (step S308).

Next, following there lease of the move exclusive control range in the step S308, the use management unit 118 generates an invalidation completion notification indicating that the invalidation of the transmission completion range has been completed (step S309), and transmits the generated invalidation completion notification to the communication unit 101. The communication unit 101 transmits the invalidation completion notification to the client device 20, and the communication unit 201 of the client device 20 transmits the invalidation completion notification (step S310).

Upon reception of the invalidation completion notification via the communication unit 201, the use management unit 217 validates the use of the reception completion range by setting "0" in the use flag field of the use management information (step S311). Next, the use management unit 217 generates a validation completion notification indicating that the validation of the reception completion range has been completed (step S312), and transmits the generated validation completion notification to the communication unit 201.

The communication unit 201 transmits the invalidation completion notification to the server device 10, and the communication unit 101 of the server device 10 receives the validation completion notification (step S313).

Upon reception of the validation completion notification via the communication unit 101, the use management unit 118 allows the transmission completion range to be deleted by setting "1" in the deletion flag field of the use management information (step S314).

With "1" set in the deletion flag field, the content processing unit 117 is allowed to delete, from the content storage unit 102, the partial content indicated by the transmission completion range of the use management information.

<Summary>

As described above, the server device 10 is a content management device which is connected to a plurality of terminal devices and moves a content to each of the terminal devices. Here, the content management device comprises: a content storage unit storing at least one content; a move information management unit storing first range information indicating a first range which is a portion or an entirety of a content which is in a move process to one of the terminal devices; a range information receiving unit operable to receive, from a terminal device, second range information indicating a second range, which is requested to be moved, of the content; a judgement unit operable to make a judgement, whether the first range information and the second range information overlap with each other at least partially or not; and a control unit operable, if the judgement is negative, to permit the second range to be moved to the terminal device.

Also, the client device 20 is a terminal device which receives a content from a content management device having the content. Here, the terminal device comprises: a key sharing unit operable to share a session key with the content management device; a range information generating unit operable to generate range information indicating a range which is, a portion or an entirety of a content which is requested to be moved; an encryption unit operable to encrypt the range information with use of the session key; and a range information transmitting unit operable to transmit the encrypted range information to the content management device.

According to the content management system 1 of the present embodiment, multiple move processes can be performed simultaneously in a case where multiple client devices each request a different particular range of a particular content. This is made possible by limiting the range exclusively controlled from each of the client devices to the particular range of the particular content.

In this way, when one client device is performing a move process, it is less likely that other client devices need to wait for the completion of the move process, improving user convenience as a result.

Also, according to the present embodiment, a portion of the content can be moved, making it unnecessary to move the entire content, thereby minimizing the required time for the move process. In addition, the move process can be performed even in a case where the remaining memory capacity of the client device which is the destination device of the move process is less than the size of the entire content and is equal to or more than the size of the partial content to be acquired.

Application examples may include a case in which particular segments of news programs are moved in a short period of time and a compilation of the segments is performed using another device, and a case in which only programs (main programs) excluding TV advertisements are moved, removing the advertisements. In cases of removing the TV advertisements, the TV advertisements can be removed by the server device, transmitting only the main programs to the client device, or, alternatively, the client device can request the server device to move only the main programs based on information, received in advance from the server device, indicating the main programs.

Further, the client device notifies the server device, the source of the move process, of the particular range of the particular content, which is requested to be moved, after encrypting the above-described particular range. Consequently, the content management system 1 of the present embodiment can prevent a malicious program from setting an unnecessary exclusive control range in the server device for the purpose of attack.

<Modifications>

While the present invention has been described through the above-described embodiment, it is not limited to the embodiment, and, for example, includes the following modifications as well.

(1) While in the above-described embodiment, the server device 10 performs a move exclusive control, on the client device 20, for each partial content, the move exclusive control of the present invention is not limited to this and includes cases where the move exclusive control is performed for each content.

(2) In the above-described embodiment, the client device 20 sends a reception completion notification, the reception completion range in which corresponds to an entire partial content, that is, a move range, to the server device 10 upon completion of transmission and reception of the partial content. The present invention, however, is not limited to cases where the reception completion range and the move range match each other.

The client device 20 can sequentially send a reception completion notification to the server device 10 for each of reception completion ranges before the entire partial content is received, that is to say, during the move process. And, after that, the client device 20 and the server device 10 may transmit/receive invalidation completion notifications and validation completion notifications, performing invalidation and validation of the reception completion range.

(3) In the above-described embodiment, reception completion notification, invalidation completion notification and validation completion notification are used to invalidate use by the server device 10 and validate use by the client device 20 in order to avoid a loss of the content in the event of a network failure. The present invention, however, is not limited to this structure and includes cases where the server device 10 invalidates the use of the partial content immediately after sending the partial content to the client device 20, and the client device 20 validates the use of the partial content immediately after receiving the partial content, allowing an easier system implementation.

(4) Also, while in the above-described embodiment, content range information is specified using byte counts from the starting position of the content, specification of content range information is not limited to the byte counts, and an elapsed time from the start of the content can be used instead.

(5) Additionally, the content range information in the above-described embodiment can be set to a location in the content, to which a random access is possible. Further, the content range information can be set to a location which matches the data structure of the content (a first bit of MPEG2-TS packet and the like).

Also, the present invention includes cases where, when the position of a range set by the client device 20 does not match the data structure of the content, the server device 10 adjusts the range set by the client device 20 such that the position of the range matches the data structure of the content which includes the range set by the client device 20.

(6) Also, in the above-described embodiment, (a) content identification information and content range information stored in a move request and (b) a move exclusive control range preliminarily set by the client device 20a, which is another client device performing another move process, are compared, and if (a) and (b) overlap with each other even partially, it is determined that a move process to the client device 20 cannot be performed. The present invention, however, is not limited to this structure.

For example, if (a) and (b) are found, in the above comparison, to overlap with each other only partially, a range which does not overlap with (b) can be set as a new move exclusive control range, and a content within this range can be permitted to be moved to the client device 20.

(7) Also, in cases where the server device 10 permits a content to be moved to the client device 20, the server device 10 may include, in a move request response to be transmitted to the client device 20, a notification of a URI with which one or more ranges requested to be moved can be acquired collectively.

(8) Additionally, while in the above-described embodiment, a content is moved from the server device 10 to the client device 20, the present invention may be applied to a structure where a content is moved from the client device 20 to the server device 10.

(9) Part or all of functional blocks constituting the server device 10 and part or all of functional blocks constituting the client device 20 in the above-described embodiment may be achieved in a LSI, an integrate circuit. These function blocks may be integrated into a single chip individually, or part or all of these function blocks may be integrated into a single chip. An integrated circuit may be referred to as an IC, system LSI, super LSI, ultra LSI or the like according to its integration degree. Also, a circuit integration method is not limited to LSI, and a dedicated communication circuit or a general-purpose processor can be applied for realization. Also, the system LSI may be replaced with the FPGA (Field Programmable Gate Array) that can be re-programmed after the LSI is manufactured, or the reconfigurable processor that can re-configure the connection or setting of circuit cells within the LSI. Furthermore, a technology for an integrated circuit that replaces the LSI may appear in the near future as the semiconductor technology improves or branches into other technologies. In that case, the new technology may be incorporated into the integration of the functional blocks constituting the present invention as described above. Such possible technologies include biotechnology.

(10) The present invention may be methods shown by the above. The present invention may be a computer program that allows a computer to realize the methods.

Furthermore, the present invention may be a computer-readable recording medium such as a flexible disk, a hard disk, CD-ROM, MO, DVD, DVD-ROM, DVD RAM, BD (Blu-ray Disc), or a semiconductor memory, that stores the computer program or the digital signal. Furthermore, the present invention may be the computer program or the digital signal recorded on any of the aforementioned recording mediums.

(11) The present invention may be any combination of the above-described embodiment and modifications.

INDUSTRIAL APPLICABILITY

The present invention may be utilized, in industries which provide move processes of contents from server devices to client devices, as a structure for providing the move processes with consideration given to convenience of the client device users.

The invention claimed is:

1. A content management device which is to be connected to a plurality of terminal devices via a home network and moves a content to each of the terminal devices via the home network, the content management device comprising:
a content storage unit for storing at least one content;
a move information management unit for storing first range information including a first content identifier and a first range that are related to a content, a portion of which is in a process of moving to one of the terminal devices, the first content identifier being used for uniquely identifying the related content, and the first range corresponding to the portion;
a range information receiving unit operable to receive, from one of the terminal devices which requests a move of a portion of a content, second range information including a second content identifier and a second range, the second content identifier being used for uniquely identifying the content, the portion of which is requested to be moved, and the second range corresponding to the portion requested to be moved;
a judgement unit operable to make a judgement, using the first range information and the second range information, whether the first range and the second range overlap at least partially or not; and
a control unit operable, if the judgement is negative, to permit the portion corresponding to the second range to be moved via the home network to the terminal device requesting the move even when a copy control information of the content is set to a status of no more copies.

2. The content management device of claim 1, wherein the move information management unit is further configured such that, if the portion corresponding to the second range is permitted to be moved, the move information management unit further stores the second range information as first range information.

3. The content management device of claim 2, further comprising:
a move encryption key generating unit operable to generate a move encryption key and key identification information if the portion corresponding to the second range is permitted to be moved, the move encryption key being used for encrypting the portion corresponding to the second range, and the key identification information being used for uniquely identifying the move encryption key; and
a move encryption key transmitting unit operable to transmit the move encryption key and the key identification information to the terminal device requesting the move.

4. The content management device of claim 3, further comprising:
a move request receiving unit operable to receive, from the terminal device requesting the move, the move request which includes the key identification information;
an encryption unit operable, upon reception of the move request, to read, from the content storage unit, the portion permitted to be moved and to encrypt the read portion with use of the move encryption key; and
a content transmitting unit operable to transmit part or an entirety of the encrypted portion to the terminal device requesting the move.

5. The content management device of claim 4, further comprising:
a key sharing unit operable to share a session key with the terminal device requesting the move; and
a decryption unit operable to decrypt, with use of the session key, the second range information which was encrypted with use of the session key by and received from the terminal device requesting the move.

6. The content management device of claim 4, further comprising
an invalidation unit operable, each time the part of the encrypted portion has been transmitted, to invalidate use of part, which corresponds to the transmitted part, of the portion in the content management device.

7. The content management device of claim 6, wherein
the invalidation unit is further configured such that, each time the transmission of the part is completed and a notification of completion of a reception of the transmitted part is received from the terminal device that received the transmitted part, the invalidation unit invalidates the use of the corresponding part in the content management device, and
the content management device further comprising:
a notification unit operable to send, to the terminal device to which the part was transmitted, a notification that the use of the corresponding part in the content management device has been invalidated.

8. The content management device of claim 4, further comprising
an invalidation unit operable, after the entirety of the encrypted portion corresponding to the second range has been transmitted, to invalidate use of the portion, which corresponds to the second range, in the content management device.

9. The content management device of claim 8, wherein
the invalidation unit is further configured such that, each time the transmission of the entirety is completed and a notification of completion of a reception of the transmitted entirety is received from the terminal device that received the transmitted entirety, the invalidation unit invalidates the use of the portion, which corresponds to the second range, in the content management device, and
the content management device further comprising:
a notification unit operable to send, to the terminal device to which the entirety was transmitted, a notification that the use of the corresponding entirety in the content management device has been invalidated.

10. The content management device of claim 1, wherein
the control unit is operable to change the second range such that the changed second range contains the second range and matches a data structure of the content, the portion of which is requested to be moved.

11. The content management device of claim 1, wherein
the control unit is further configured such that, if the judgement is affirmative, the control unit performs a control such that a range of the content is permitted to be moved to the terminal device requesting the move, the range being within the second range and out of the first range.

12. A terminal device which receives a content via a home network from a content management device having the content, comprising:
   a key sharing unit operable to share a session key with the content management device;
   a range information generating unit operable to generate range information including content identification information and a range, the content identification information being used for uniquely identifying the content, a portion of which was requested to be moved, and the range corresponding to the portion;
   an encryption unit operable to encrypt the range information with use of the session key;
   a range information transmitting unit operable to transmit the encrypted range information to the content management device;
   a key information receiving unit operable, if the portion is permitted by the content management device to be moved, to receive a move decryption key and key identification information, the move decryption key being used for decrypting the portion, and the key identification being used for uniquely identifying the move decryption key;
   a move request transmitting unit operable to transmit a move request including the key identification information to the content management device;
   a content receiving unit operable to receive, from the content management device via the home network, part or an entirety of the portion which has been encrypted even when a copy control information of the content is set to a status of no more copies;
   a decryption unit operable to decrypt the part or the entirety of the encrypted portion in accordance with the move decryption key;
   a reception completion range notification unit operable to notify the content management device of a range of the part or the entirety, a reception of which is completed;
   an invalidation notification reception unit operable to receive, from the content management device, an invalidation notification indicating that use of the part or the entirety in the content management device is invalidated; and
   a validation unit operable to validate, upon reception of the invalidation notification, use of the part or the entirety.

13. The terminal device of claim 12, wherein
   the validation unit is further configured such that, each time the content receiving unit completes receiving the part of the encrypted portion, the validation unit validates use of the received part.

14. The terminal device of claim 12, wherein
   the validation unit is further configured such that, upon completion of receiving the entirety of the encrypted portion by the content receiving unit, the validation unit validates use of the received entirety.

15. The terminal device of claim 12, wherein
   the range information generating unit is operable to use a content URI (Uniform Resource Identifier) as the content identification information, and to use a byte position beginning from a starting position of the content as the range information.

16. The terminal device of claim 15, wherein
   the range information generating unit is operable to use the byte position which matches a data structure of the content as the range included in the range information.

17. The terminal device of claim 12, wherein
   the range information generating unit is operable to use a temporal position beginning from a start of the content as the range included in the range information.

18. A content management system which moves a content via a home network from a content management device to a plurality of terminal devices, wherein
   the content management device includes:
   a content storage unit for storing at least one content;
   a move information management unit for storing first range information including a first content identifier and a first range that are related to a content, a portion of which is in a process of moving to one of the terminal devices, the first content identifier being used for uniquely identifying the related content, and the first range corresponding to the portion;
   a range information receiving unit operable to receive, from one of the terminal devices which requests a move of a portion of a content, second range information including a second content identifier and a second range, the second content identifier being used for uniquely identifying the content, the portion of which is requested to be moved, and the second range corresponding to the portion requested to be moved;
   a judgement unit operable to make a judgement, using the first range information and the second range information, whether the first range and the second range overlap at least partially or not; and
   a control unit operable, if the judgement is negative, to permit the portion corresponding to the second range to be moved via the home network to the terminal device requesting the move even when a copy control information of the content is set to a status of no more copies, and
   the terminal device requesting the move includes:
   a second range information generating unit operable to generate the second range information;
   a second range information transmitting unit operable to transmit the second range information to the content management device; and
   a content receiving unit operable to receive, from the content management device, the portion corresponding to the second range.

19. The content management system of claim 18, wherein
   the content management device further includes:
   a move encryption key generating unit operable to generate a move encryption key and key identification information if the portion corresponding to the second range is permitted to be moved, the move encryption key being used for encrypting the portion corresponding to the second range, and the key identification information being used for uniquely identifying the move encryption key;
   a move encryption key transmitting unit operable to transmit the move encryption key and the key identification information to the terminal device requesting the move;
   a move request receiving unit operable to receive, from the terminal device requesting the move, a move request which includes the key identification information;
   an encryption unit operable, upon reception of the move request, to read, from the content storage unit, the portion permitted to be moved and encrypt the read portion with use of the move encryption key; and
   a content transmitting unit operable to transmit the encrypted portion to the terminal device requesting the move, and the terminal device requesting the move further includes:
a key information receiving unit operable, if the portion corresponding to the second range is permitted by the content management device to be moved, to receive the move encryption key and the key identification information;
a move request transmitting unit operable to transmit a move request including the key identification information to the content management device;
a content receiving unit operable to receive, from the content management device, the portion which has been encrypted; and
a decryption unit operable to decrypt the encrypted portion in accordance with the move encryption key.

20. The content management system of claim 19, wherein the content management device further includes:
a first key sharing unit operable to share a session key with the terminal device which has sent the second range information; and
a decryption unit operable to decrypt, with use of the session key, the second range information which was encrypted with use of the session key by the terminal device which has sent the second range information, and the terminal device which has sent the second range information includes:
a second key sharing unit operable to share the session key with the content management device; and
an encryption unit operable to encrypt the second range information with use of the session key.

21. An integrated circuit included in a content management device which is to be connected to a plurality of terminal devices via a home network and moves a content to each of the terminal devices via the home network, the integrated circuit comprising:
a content storage unit for storing at least one content;
a move information management unit for storing first range information including a first content identifier and a first range that are related to a content, a portion of which is in a process of moving to one of the terminal devices, the first content identifier being used for uniquely identifying the related content, and the first range corresponding to the portion;
a range information receiving unit operable to receive, from one of the terminal devices which requests a move of a portion of a content, second range information including a second content identifier and a second range, the second content identifier being used for uniquely identifying the content, the portion of which is requested to be moved, and the second range corresponding to the portion requested to be moved;
a judgement unit operable to make a judgement, using the first range information and the second range information, whether the first range and the second range overlap at least partially or not; and
a control unit operable, if the judgement is negative, to permit the portion corresponding to the second range to be moved via the home network to the terminal device requesting the move even when a copy control information of the content is set to a status of no more copies.

22. A content management method used by a content management device which is connected to a plurality of terminal devices via a home network and moves a content to each of the terminal devices via the home network, wherein
the content management device includes:
a content storage unit for storing at least one content; and
a move information management unit for storing first range information including a first content identifier and a first range that are related to a content, a portion of which is in a process of moving to one of the terminal devices, the first content identifier being used for uniquely identifying the related content, and the first range corresponding to the portion,
the content management method comprising:
a range information receiving step of receiving, from one of the terminal devices which requests a move of a portion of a content, second range information including a second content identifier and a second range, the second content identifier being used for uniquely identifying the content, the portion of which is requested to be moved, and the second range corresponding to the portion requested to be moved;
a judging step of making a judgement, using the first range information and the second range information, whether the first range and the second range overlap at least partially or not; and
a permitting step of permitting, if the judgement made in said judging step is negative, the portion corresponding to the second range to be moved via the home network to the terminal device requesting the move even when a copy control information of the content is set to a status of no more copies.

23. An integrated circuit included in a terminal device which receives a content via a home network from a content management device having the content, the integrated circuit comprising:
a key sharing unit operable to share a session key with the content management device;
a range information generating unit operable to generate range information including content identification information and a range, the content identification information being used for uniquely identifying the content, a portion of which was requested to be moved, and the range corresponding to the portion;
an encryption unit operable to encrypt the range information with use of the session key;
a range information transmitting unit operable to transmit the encrypted range information to the content management device;
a key information receiving unit operable, if the portion is permitted by the content management device to be moved, to receive a move decryption key and key identification information, the move decryption key being used for decrypting the portion, and the key identification being used for uniquely identifying the move decryption key;
a move request transmitting unit operable to transmit a move request including the key identification information to the content management device;
a content receiving unit operable to receive, from the content management device via the home network, part or an entirety of the portion which has been encrypted even when a copy control information of the content is set to a status of no more copies;
a decryption unit operable to decrypt the part or the entirety of the encrypted portion in accordance with the move decryption key;
a reception completion range notification unit operable to notify the content management device of a range of the part or the entirety, a reception of which is completed;
an invalidation notification reception unit operable to receive, from the content management device, an invalidation notification indicating that use of the part or the entirety in the content management device is invalidated; and a validation unit operable to validate, upon reception of the invalidation notification, use of the part or the entirety.

24. A content acquiring method used by a terminal device which receives a content via a home network from a content management device having the content, the content acquiring method comprising:

a key sharing step of sharing a session key with the content management device;

a range information generating step of generating range information including content identification information and a range, the content identification information being used for uniquely identifying the content, a portion of which was requested to be moved, and the range corresponding to the portion;

an encrypting step of encrypting the range information with use of the session key;

a range information transmitting step of transmitting the encrypted range information to the content management device;

a key information receiving step of receiving, if the portion is permitted by the content management device to be moved, a move decryption key and key identification information, the move decryption key being used for decrypting the portion, and the key identification being used for uniquely identifying the move decryption key;

a move request transmitting step of transmitting a move request including the key identification information to the content management device;

a content receiving step of receiving, from the content management device via the home network, part or an entirety of the portion which has been encrypted even when a copy control information of the content is set to a status of no more copies;

a decrypting step of decrypting the part or the entirety of the encrypted portion in accordance with the move decryption key;

a reception completion range notifying step of notifying the content management device of a range of the part or the entirety, a reception of which is completed;

an invalidation notification receiving step of receiving, from the content management device, an invalidation notification indicating that use of the part or the entirety in the content management device is invalidated; and a validating step of validating, upon reception of the invalidation notification, use of the part or the entirety.

* * * * *